Oct. 3, 1944.   G. J. KLOPFENSTEIN   2,359,368
FILTER ELEMENT
Filed Aug. 19, 1941
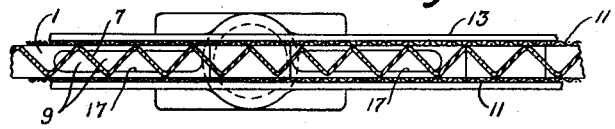
Fig. 4
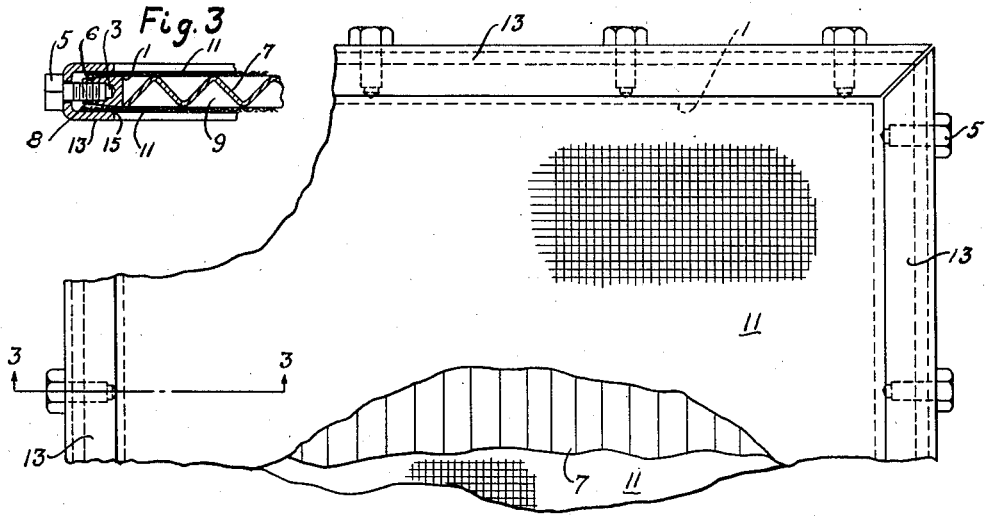
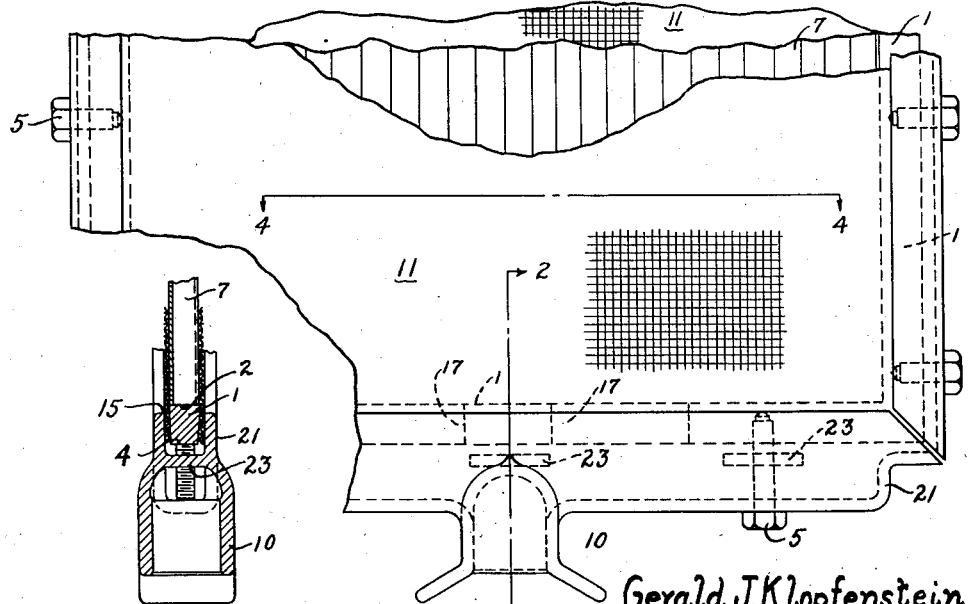
Fig. 2   Fig. 1
Gerald J. Klopfenstein
INVENTOR.
BY Edmund W. C. Kamm
ATTORNEY.

Patented Oct. 3, 1944

2,359,368

UNITED STATES PATENT OFFICE 2,359,368

FILTER ELEMENT

Gerald J. Klopfenstein, Fort Wayne, Ind., assignor to S. F. Bowser & Company, Incorporated, Fort Wayne, Ind., a corporation of Indiana Application August 19, 1941, Serial No. 407,467

9 Claims. (Cl. 210—195)

This invention relates to a filter element which is utilized in a tank containing an unfiltered liquid, for supporting a coating of filter aid material such as diatomaceous earth, fuller's earth or other filtering substances and for conducting the liquid which passes through such coating to a filtrate discharge line.

It is an object of the invention to provide a filter element which can be readily dismantled for cleaning, for repair or for replacement of worn or broken parts.

It is another object of the invention to provide a filter element having fine mesh screens which can be mounted without soldering or otherwise permanently attaching them.

Yet another object of the invention is to provide a filter element in which the filtrate can escape readily and without substantial restriction.

Still another object of the invention is to provide a filter screen which is rigid and which will withstand frequent handling.

These and other objects of the invention will become apparent from a study of this specification and the drawing which is appended hereto and made a part hereof and wherein:

Figure 1 is an elevation showing the filter element and having parts broken away to show the interior thereof.

Figure 2 is a sectional view taken on the line 2—2 of Figure 1 showing the construction in the region of the discharge nozzle.

Figure 3 is a sectional view taken on the line 3—3 of Figure 1 showing the side frame construction.

Figure 4 is a sectional view on the line 4—4 of Figure 1 showing the drain outlets leading from the screen portion of the element to the outlet nozzle.

Referring now the drawing, numeral 1 represents a rectangular frame of solid metal bars such as steel or bronze which have a trapezoidal cross-section. The parallel surfaces form the inner and outer peripheral surfaces 2 and 4 respectively of the frame and the non-parallel surfaces 6 and 8 converge outwardly from at substantially the same angle with the inner surface to form lateral or screen supporting surfaces around the entire frame on both sides. The bars are preferably integrally connected at the corners of the frame as by welding or brazing.

The frame has drilled and tapped holes 3 spaced at regular intervals about its outer periphery. These holes are "blind," that is, they do not extend entirely through the frame and are adapted to receive cap screws 5.

A corrugated metal sheet 7 is disposed within the frame so that the channels 9 formed by the corrugations run from the top of the element to the outlet nozzle 10 at the bottom. This sheet also supports the screens against pressure applied from the exterior of the element.

Disposed on the frame 1 and the corrugated sheet 7 on both sides are fine mesh screens 11. These screens are usually of Monel metal, bronze or stainless steel of 24 by 110 mesh, although they may be of cloth, rubber or other suitable material. The material used depends upon the character of the liquid being filtered and the mesh of the screen depends upon the particle size of the filter aid being used.

These screens 11 overlie the tapered sides 6 and 8 of the frame 1 as is clearly shown in Figures 2 and 3, and channel-like clamps 13 which are U-shaped in cross-section are slipped over the frames and the portions of the screens which overlap the frame. These clamping channels are then drawn down by tightening the cap screws 5 and as the leading edges 15 of the channels advance they clamp the screens against the inclined sides 6 and 8 of the frame and hold the screens tightly in substantial sealing relation with the frame.

The lower bar of the frame 1 which is adjacent the nozzle is provided with openings 17 which establish communication between the channels 9 and the channel 19 in the lower clamping bar 21 which in turn communicates with the nozzle 10.

The lower channel 21 is about twice as deep as the channels 13 and has the nozzle 10 formed therein. However, the channel has leading edges 15 which coact with the frame 1 and screens 11 in the same manner as described above.

The channel 21 is provided with bridges 23 which serve to prevent undue opening of the channel when the cap screws 5 are drawn down.

The filter element is strong and rigid and will withstand handling and cleaning. It is easily demounted by removing the cap screws and pulling the clamping channels away from the frame. The screens may then be removed and cleaned from the inside as well as from the outside and the corrugated sheet and the frame can be thoroughly cleaned.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filtering element, a peripheral frame, having lateral surfaces on its opposite sides which lie in planes which converge outwardly and intersect each other, screens disposed on both sides of said frame and overlapping said surfaces and U-shaped channel members having arms which are parallel and lie in planes which do not intersect each other, said arms being adapted to embrace said frame and screens and having leading edges which clamp said screens against said lateral surfaces, the contact between any leading edge and the screen and that between the screen and a lateral surface being substantially a line contact to provide an effective seal.

2. In a filtering element, a peripheral frame, having lateral surfaces on its opposite sides which lie in planes which converge outwardly and intersect each other, screens disposed on both sides of said frame and U-shaped channel members having arms which are parallel and lie in planes which do not intersect each other, said arms being adapted to embrace said frame and screens and having leading edges which clamp said screens in substantially line contact with said lateral surfaces to provide a substantially linear seal, and means for holding said channel members in position.

3. In a filtering element, an open frame made up of bars of quadrilateral cross-section, the lateral surfaces of said bars on at least one side of said frame being inclined so that the outer peripheral surfaces of the frame have less width than the inner ones, said lateral surfaces lying in planes which converge outwardly and intersect each other, a screen disposed on said frame overlapping said lateral surfaces, and a plurality of U-shaped clamping means having arms which are parallel and lie in planes which do not intersect each other, said arms having leading edges, one clamping means embracing each bar and the associated overlapping screen edge, said leading edges cooperating with the associated bars for clamping said screen in substantially line contact against the lateral surfaces of said bars whereby an effective linear seal is provided.

4. In a filtering element, an open frame made up of bars of quadrilateral cross-section, the lateral surfaces of said bars on at least one side of said frame being inclined so that the outer peripheral surfaces of the frame have less width than the inner ones, a screen disposed on said frame overlapping said lateral surfaces, and a plurality of U-shaped clamping means, one embracing each bar and the associated overlapping screen edge, for clamping said screen against said bars, and one of said clamping means including a filtrate outlet nozzle.

5. In a filtering element, an open frame made up of bars of quadrilateral cross-section, the lateral surfaces of said bars on at least one side of said frame being inclined so that the outer peripheral surfaces of the frame have less width than the inner ones, a screen disposed on said frame overlapping said lateral surfaces, and a plurality of U-shaped clamping means, one embracing each bar and the associated overlapping screen edge, for clamping said screen against said bars, and one of said clamping means including a filtrate outlet nozzle, the bar adjacent said nozzle being provided with filtrate passages connecting the interior of said frame with said nozzle.

6. In a filtering element, an open frame made up of bars of quadrilateral cross-section, the lateral surfaces of said bars on at least one side of said frame being inclined so that the outer peripheral surfaces of the frame have less width than the inner ones, a screen disposed on said frame overlapping said lateral surfaces, and a plurality of U-shaped clamping means, one embracing each bar and the associated overlapping screen edge, for clamping said screen against said bars, and one of said clamping means including a filtrate outlet nozzle, the bar adjacent said nozzle being provided with filtrate passages connecting the interior of said frame with said nozzle, and a corrugated screen support mounted in said frame with the corrugations directed toward said filtrate passages.

7. In a filtering element, an open frame made up of bars of quadrilateral cross-section, the lateral surfaces of said bars on at least one side of said frame being inclined so that the outer peripheral surfaces of the frame have less width than the inner ones, a screen disposed on said frame overlapping said lateral surfaces, and a plurality of U-shaped clamping means, one embracing each bar and the associated overlapping screen edge, for clamping said screen against said bars, and one of said clamping means including a filtrate outlet nozzle, said last named clamping means being of greater depth than the others to provide a filtrate channel communicating with said outlet nozzle.

8. In a filtering element, an open frame made up of bars of quadrilateral cross-section, the lateral surfaces of said bars on at least one side of said frame being inclined so that the outer peripheral surfaces of the frame have less width than the inner ones, a screen disposed on said frame overlapping said lateral surfaces, and a plurality of U-shaped clamping means, one embracing each bar and the associated overlapping screen edge, for clamping said screen against said bars, and one of said clamping means including a filtrate outlet nozzle, said last named clamping means being of greater depth than the others to provide a filtrate channel communicating with said outlet nozzle, and tie members bridging said channel to resist spreading thereof when it is clamped on said frame.

9. In a filtering element, a peripheral frame having substantially planar lateral surfaces on its opposite sides which lie in planes which converge outwardly and intersect each other, a screen disposed on the frame and having one side disposed above said surface, a U-shaped clamping member having arms which are parallel and lie in planes which do not intersect each other, each arm having a leading edge, said member having a length substantially equal to the length of said surface, means for guiding said member for motion toward said frame in a path which causes said edge to intersect said surface, whereby said edge serves to clamp said screen against said surface to form a substantially line contact therewith throughout the length of said edge, and means for moving said clamping member into clamping position.

GERALD J. KLOPFENSTEIN.